Patented Oct. 27, 1931

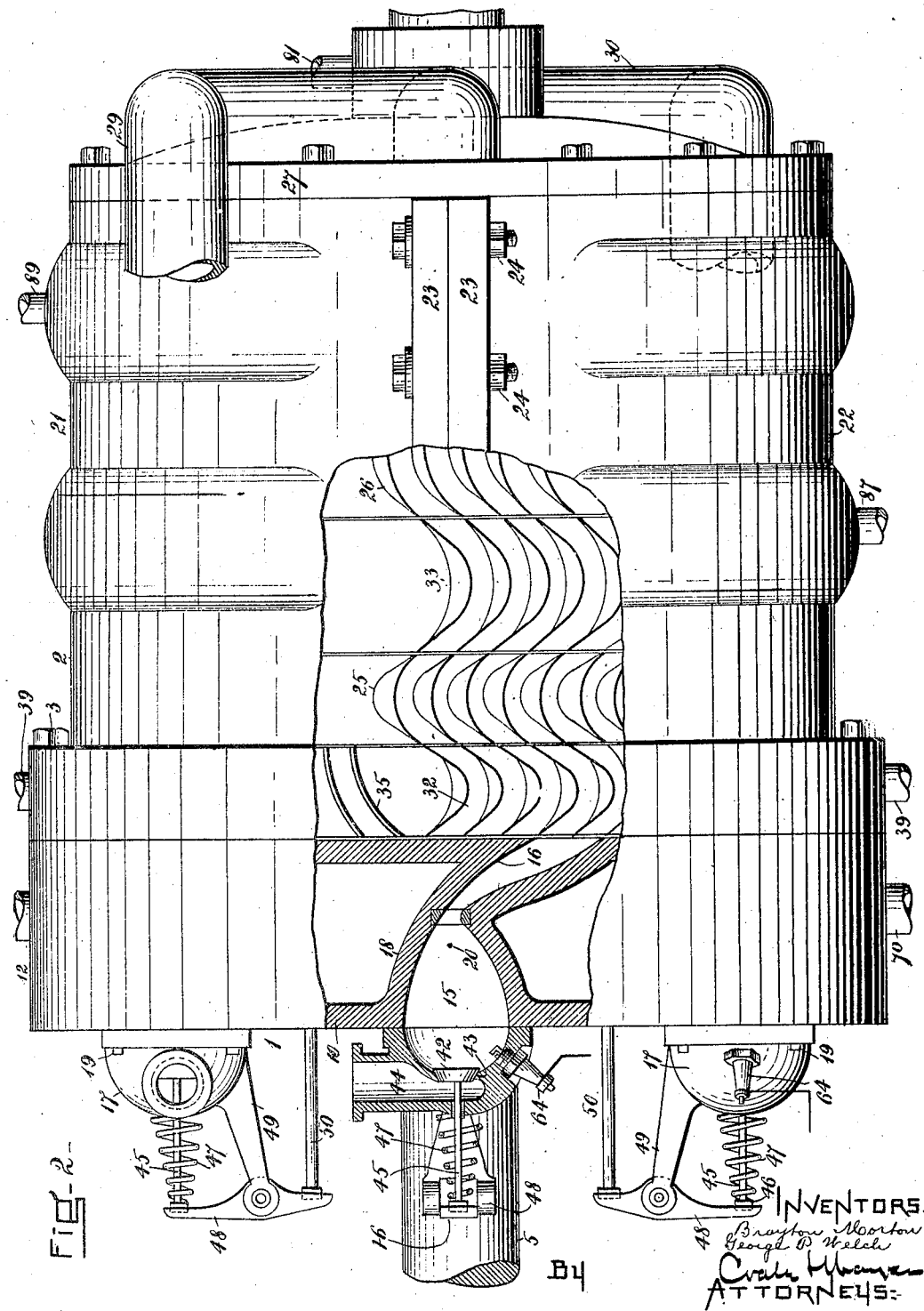

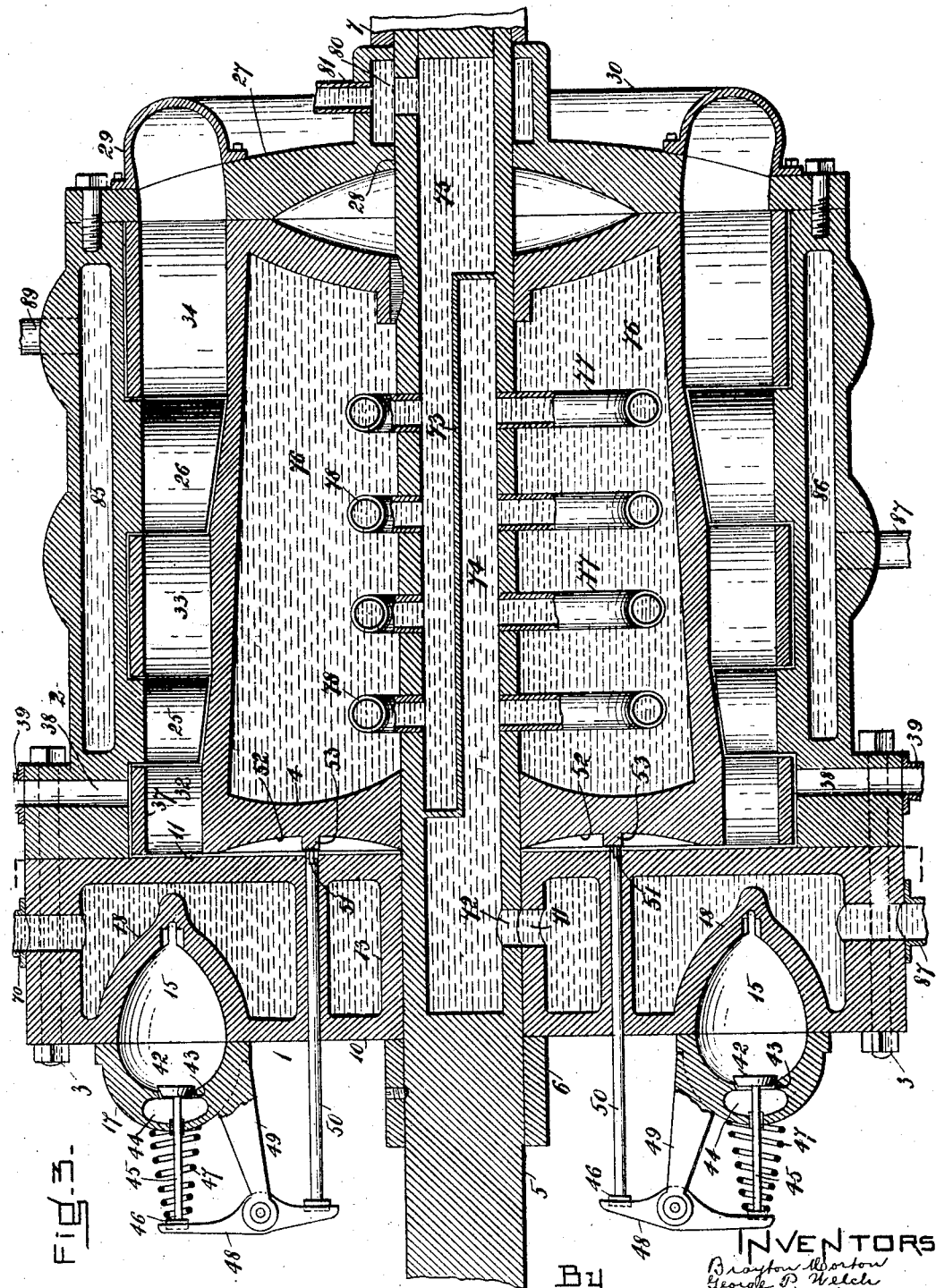

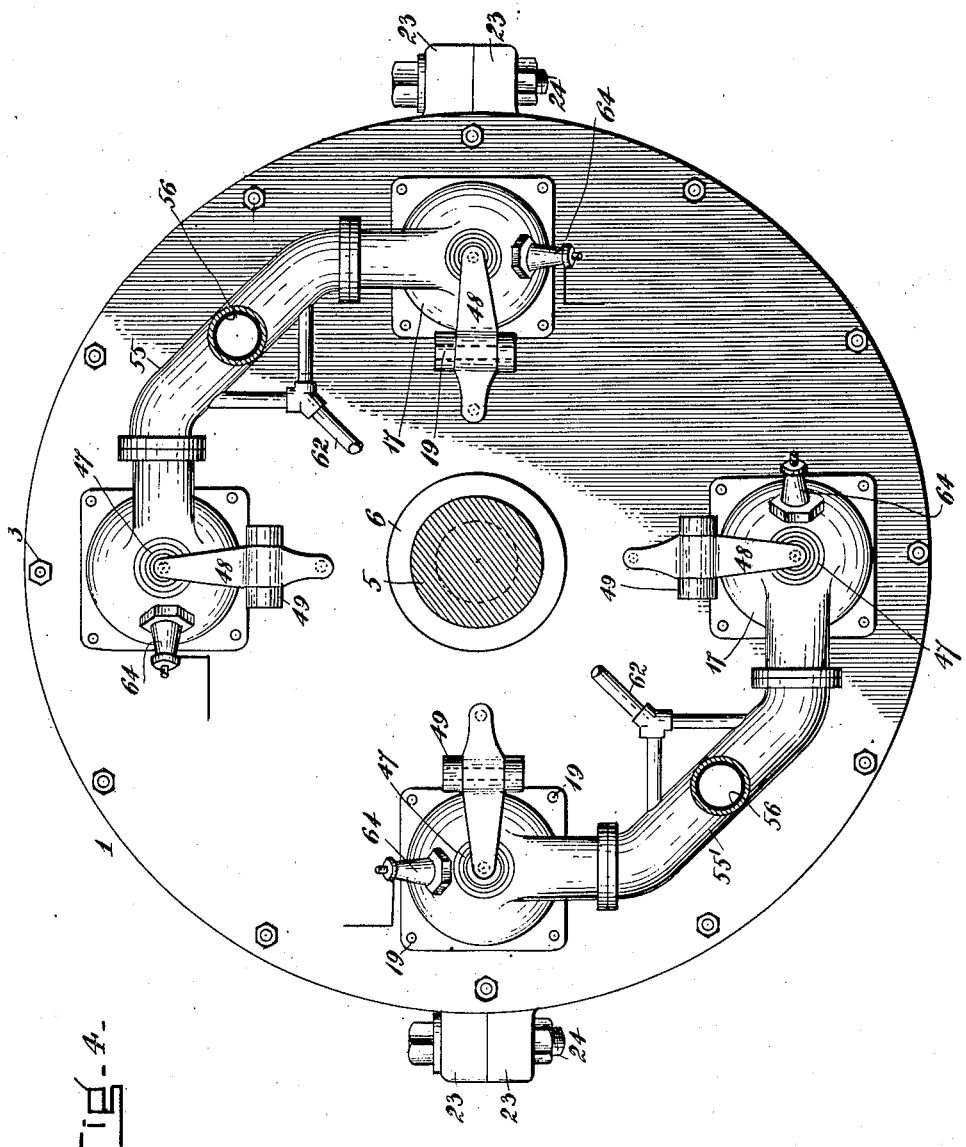

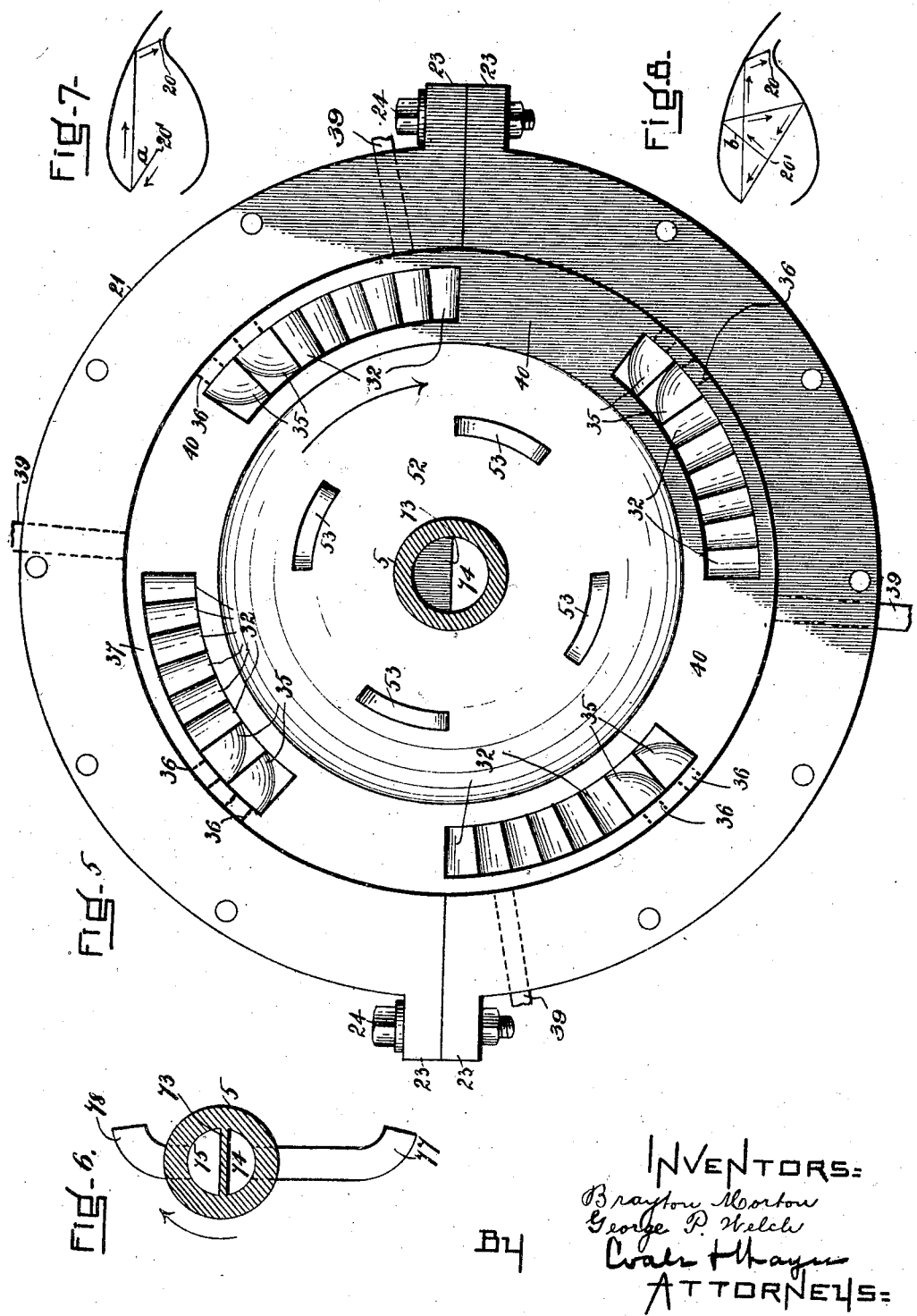

1,828,782

UNITED STATES PATENT OFFICE

BRAYTON MORTON, OF FALL RIVER, AND GEORGE P. WELCH, OF CAMBRIDGE, MASSACHUSETTS

GAS TURBINE

Application filed May 18, 1925. Serial No. 31,049.

The present invention relates to an improved motor of the gas turbine type.

The general object of the invention is to provide a gas turbine that will develop usable power efficiently and be capable of being adequately cooled.

With this end in view the invention consists of various novel features of construction and combination of parts as will hereinafter be described and pointed out in the claims.

Referring to the drawings:—

Fig. 2 is an elevation of the assembled motor partly cut away and showing the explosion chamber, its nozzles and the gas path through the motor.

Fig. 3 is a cross sectional view of the motor.

Fig. 4 is a rear elevation thereof.

Fig. 5 is a rear elevation of the rotor in its casing.

Fig. 6 is a cross section of the main shaft inside the rotor.

Figs. 7 and 8 are diagrammatic views of the explosion chambers to show the action of the exploded gases.

Figure 1:
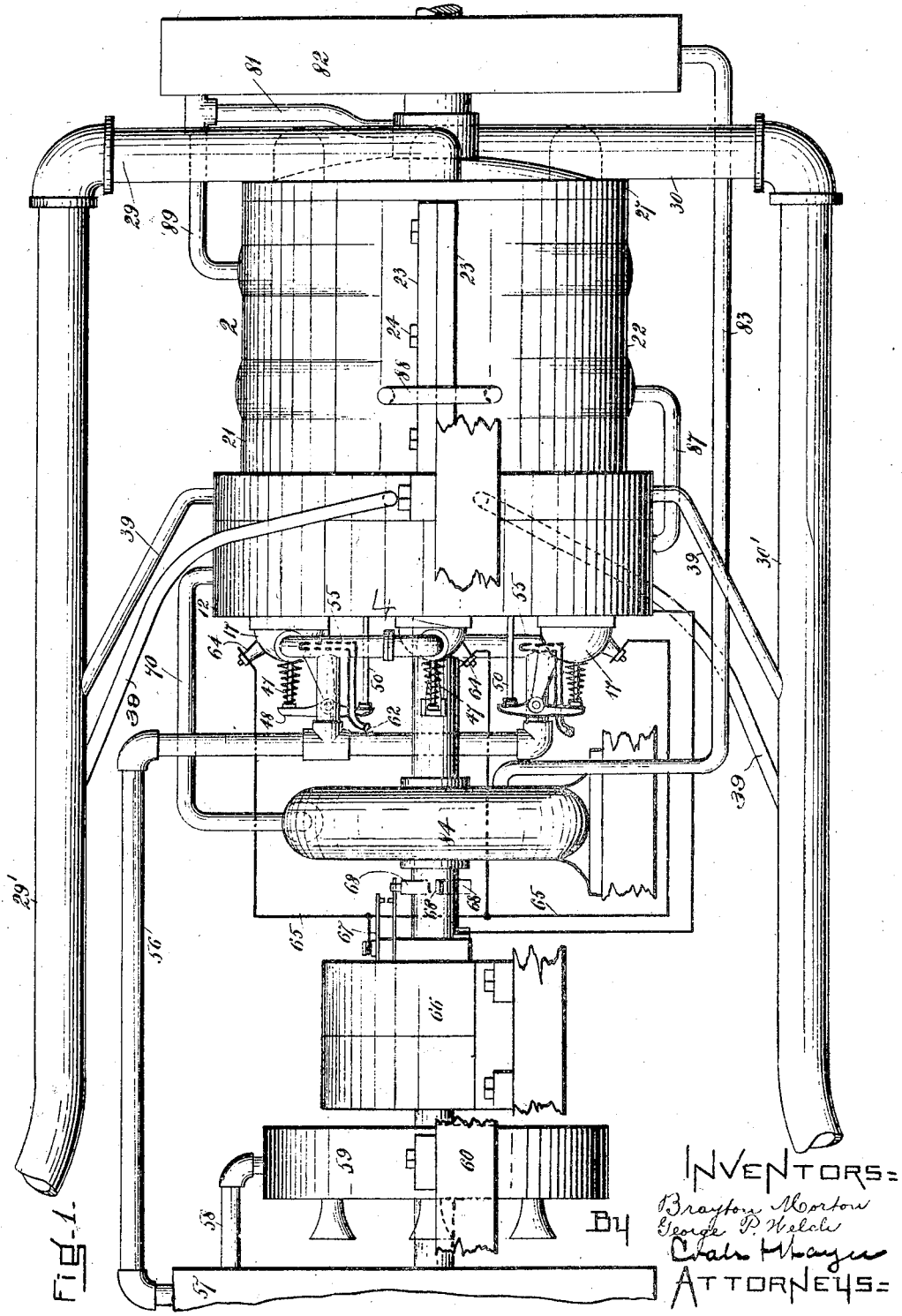
Figure 1 is a side elevation of the complete assembly including certain auxiliaries.

1 represents the head of the turbine carrying a plurality of explosion chambers. 2 is a casing to which the head is secured by bolts 3. Both the head and casing are fixed. 4 is the rotor mounted within the casing and rotated by successive discharges from the explosion chambers on the head. The rotor is fixed to a main shaft 5 in any suitable manner and preferably by integral connection. The shaft extends axially through the head and end portion of the casing and turns in bearings thereon. Endwise displacement of the shaft is prevented by collars 6 and 7 thereon arranged adjacent the head and end of the casing, respectively.

The head 1 comprises a chambered block generally annular in form with opposing spaced sides 10 and 11, respectively, peripheral edge 12 and interior hub 13. The hub provides one of the main bearings for the main shaft by which the shaft will turn on the head.

The head contains a number of explosion chambers 15 with nozzles 16 leading therefrom through the side 11 of the head. The explosion chambers are radially arranged around the main shaft equidistant therefrom and are also spaced equidistant from one another. For purposes of illustration four explosion chambers with nozzles leading therefrom are shown in the present instance.

The explosion chambers are alike in form and are made sectional in character, each consisting of sections 17 and 18, respectively. Of these, the section 18 with nozzle 16 leading therefrom is preferably cast integral with the head while the section 17 in the form of a cap lies exterior to the head and is fastened to the side 10 thereof by bolts or other suitable fastening 19.

The casing 2 within which the rotor operates comprises a tubular shell preferably sectional in character consisting of two half sections 21, 22 having flanges 23 along their abutting edges fastened together by bolts 24. The casing carries upon its interior separate spaced sets of stator turbine blades 25, 26, respectively. These stator blades co-operate with the turbine blades of the rotor, later to be referred to, for redirecting the impact gases acting upon the blades of the rotor and by which the propelling force of the gases is utilized to the utmost, as is customary in turbine construction of the present kind.

The end plate 27 of the casing presents an interior bearing 28 for the main shaft extending through the plate, thus forming one of the main bearings on which the shaft turns. The end plate is also provided with exhaust conduits 29, 30 leading from the interior of the casing and through which the impact gases for operating the rotor exhaust. The exhaust conduits 29 and 30 are extended respectively by extensions 29' and 30' which pass back over and alongside the rotor casing.

The rotor 4, fixed to the main shaft for turning it, is located in the space between the head 1 and the end plate 27 of the casing and is enclosed by the casing. The rotor carries spaced series of power turbine blades 32, 33, 34. The series of blades 32 receive the impact of the gases as they issue from the nozzles from the explosion chambers. The series of blades 33 receive the impact of the gases after being redirected by the stator blades 25 on the casing, while the series of blades 34 receive the impact of the gases after being redirected by the stator blades 26 on the casing. The blades of each of the series 32, 33, 34 are not continuous about the periphery of the rotor, but are arranged in spaced sets or batteries corresponding in number with the number of explosion chambers and accordingly in the present instance, with four explosion chambers, are arranged 90 degrees apart. The blades of the respective series 32, 33, 34 are also of a gradually increasing depth and width to allow for the expansion of the hot gases and thereby give to the rotor the general shape of a stepped cone.

Arranged on the rotor in openings therein just back of each set of power blades 32 thereon are scouring vanes 35. (See Figs. 2 and 5.) Leading from these vanes through the peripheral edge of the rotor are ports or openings 36 which have communication, as the rotor is turned, with passages 38 extending through the rotor casing and connecting by pipes 39 with one or the other of the conduit extensions 29' 30' through which the impact gases are exhausted. The passages 38 and pipes 39 leading from them correspond in number with the number of sets of ports or openings 36 and scouring vanes, being four in the present instance, equally spaced from one another in circumferential direction. The disposition and arrangement of the passages 38 is o'herwise such with relation to the ports or openings 36 and scouring vanes, that during the rotation of the rotor just after the firing of the charges in the explosion chambers and the discharge of impact gases onto the power blades of the rotor, the scouring vanes and ports or openings 36 leading therefrom will be brought into a position coincident with both the outlets to the nozzles from the explosion chambers and with the passages leading to the conduits through which the impact gases are exhausting. Thereupon the scouring vanes will exert a more or less disturbing influence upon the exhausted gases in the explosion chambers and these gases will pass through the ports 36 and passages 38, then coincident with one another, and into the exhaust conduits for the impact gases. At this same time the partial vacuum developed within the exhaust conduits for the impact gases. or suction therein developed by the exhaust of these gases, will tend to suck or draw the exploded gases from out of the explosion chambers, thereby evacuating these chambers of such gases.

Following the scouring vanes 36 and arranged just back of each set of these vanes the end of the rotor facing the side 11 of the head 1 presents solid portions 40 which are adapted during the operation of the rotor to form a gas tight fit over the mouths of the nozzles 16; in other words, close the outlets from the explosion chambers preliminary to the recharging of these chambers, the precise arrangement of these solid portions 40 being such as to attain this end.

Referring now to the means for controlling the application of fuel to the explosion chambers and for firing these chambers: The inlet to each of the explosion chambers is controlled by an outward-closing valve 42 which closes against a seat 43 formed at the entrance to the chamber and closes it from a fuel-mixing chamber 44 preferably formed on each of the cap sections in continuation of the fuel and air intake manifolds later to be referred to. The valve 42 is carried by a valve stem 45 which extends outwardly through the cap and bears at its end a boss 46. Arranged upon the valve stem and interposed between the face of the cap and the boss is a spring 47 acting to normally maintain the valve in a closed position. Bearing against the end of the stem is one arm of a lever 48 fulcrumed to turn on a bracket 49 secured to the adjacent cap. Bearing against the other arm of the lever is a rod 50 which extends through the head 1 of the turbine and carries on its inner end a cam wheel 51. This cam wheel bears against the adjacent side 52 of the rotor which is made slightly concave. When the cam wheel is thus bearing, the arrangement of the parts is such that the lever 48 will be turned to a position where it will permit of the valve 42 occupying a full closed position. Formed upon the side 52 of the rotor against which the cam wheel has bearing are a number of raised cams 53. The cams 53 correspond in number with the number of explosion chambers and are so relatively arranged that the cam wheels 51 engaging and riding over these cams will rock the lever 48 and thereby open the valves for charging the explosion chambers during the time when the outlets from the respective nozzles are closed by the rotor, and afterward permit of the closing of the valves just preliminary to the firing of the charges (see Fig. 3).

A combustible mixture of air and gas is admitted to the respective explosion chambers by way of manifolds 55, 55' which connect, respectively, with the mixing chambers of a couple of explosion chambers. Air under pressure is admitted to these manifolds by way of a pipe 56 extending from an air compression tank 57. Air is admitted to and compressed within this tank by way of a pipe 58 issuing from an air compressor 59. The air compressor is arranged upon a suitable fixture of support 60 adjacent the main shaft, and the interior working mechanism (not shown) of the air compressor is operated by the main shaft. Gaseous fuel is admitted to the respective manifolds by way of fuel inlet nozzles 62 from any suitable source of supply.

The explosion chambers are fired by spark plugs 64 arranged in the cap sections of the respective chambers. Connecting with all the plugs so that all the chambers may be fired simultaneously is a suitable electric connection 65 in circuit with a magneto 66. The circuit is controlled by a switch 67 which is closed intermittently for firing the plugs by cams 68 upon the main shaft. In this connection it will be observed that four cams 68 are employed corresponding in number with the number of the explosion chambers, and occupy positions on the main shaft 90 degrees apart. They accordingly ignite the plugs and explode the charges in all the explosion chambers at each quarter revolution of the main shaft.

Reference will now be made to the cooling system of the turbine: The head 1 of the turbine forms a part of the cooling system inasmuch as its interior is adapted to be filled with water which surrounds those portions of the explosion chambers contained within the head and nozzles leading therefrom. Water is admitted to the interior of the head by way of an inlet pipe 70 and outlets therefrom by way of an outlet opening 71 in the hub 13. This opening in the hub is adapted to register during the rotation of the main shaft with an opening 72 therein into the interior of the shaft which is hollow and accordingly forms a part of the cooling system. The hollow or chamber of the shaft is divided by a partition 73 into separate compartments 74, 75, water being admitted from the head into the compartment 74. From the compartment 74 the water passes into the chambered interior 76 of the rotor which is kept filled with water. From the interior of the rotor the water passes into the compartment 75 in the shaft, thence into a jacket 80 formed in the end of the casing, and thence through a pipe 81 into the top of a water cooling radiator 82. From the bottom of the radiator the water passes by way of a pipe 83 back to connect with a water pump 84 the interior mechanism of which (not shown) is operated by the main shaft. The pipe 70, before referred to, which connects with the head leads from the pump, and by its use, water expelled from the pump is directed into the head.

The separate sections 21, 22 of the casing are also water-jacketed containing compartments 85, 86, respectively, within which water is contained. Water is directed to circulate throughout these compartments by way of a branch pipe 87 issuing from the bottom of the head and connecting with the compartment 86 in the section 22 of the casing. From the water compartment 86 connection is made with the water compartment 85 in the other section 21 of the casing by way of a pipe 88, and the section 21 is provided with an outlet pipe 89 connecting with the head of the radiator.

Having thus fully described our invention, we claim and desire to secure by Letters Patent of the United States:—

1. In a gas turbine, the combination comprising a chambered head, a chambered rotor arranged adjacent said head in substantial extension thereof, explosion chambers arranged inside the head with outlets therefrom effective for directing exploded charges to the rotor for rotating it, a chambered shaft driven by the rotor, said shaft extending into the rotor and into said head, a partition within the chamber of said shaft dividing the chamber thereof into separate compartments, one an inlet compartment and the other an outlet compartment, each in communication with the chambered interior of the rotor, a connection between the chambered interior of the head and the inlet compartment of said shaft, a radiator, a connection between the chamber of said head and the outlet end of the radiator, and a connection between the outlet compartment of said shaft and the inlet end of the radiator.

2. In a gas turbine, the combination comprising a chambered head, a chambered rotor arranged adjacent said head in substantial extension thereof, explosion chambers arranged inside the head with outlets therefrom effective for directing exploded charges to the rotor for rotating it, a chambered shaft driven by the rotor, said shaft extending into the rotor and into said head, a partition within the chamber of said shaft dividing the chamber thereof into separate compartments, one an inlet compartment and the other an outlet compartment, each in communication with the chambered interior of the rotor, a connection between the chambered interior of the head and the inlet compartment of said shaft, and other connections co-operating with said chambered head, rotor and shaft including a radiator, to form a cooling system by which a cooling fluid may be circulated through the chamber of said head and the chamber of said rotor, and means for circulating said fluid.

3. In a gas turbine, the combination comprising a chambered head, a chambered rotor arranged adjacent said head in substantial extension thereof, explosion chambers arranged inside the head with outlets therefrom effective for directing exploded charges to the rotor for rotating it, a chambered shaft driven by the rotor, said shaft extending through the rotor and into said head, a partition within the chamber of said shaft dividing the chamber thereof into separate compartments, one an inlet compartment and the other an outlet compartment, each in communication with the chambered interior of the rotor, a connection between the chambered interior of the head and the inlet compartment of said shaft, and other connections arranged between the outlet compartment of said shaft and the chamber of said head whereby said other connections will co-operate with said head, rotor and shaft to form a connected cooling system by which a cooling fluid may be circulated through the chamber of said head and thence through the chamber of said rotor.

4. In a gas turbine, the combination comprising a chambered head, a chambered rotor arranged adjacent said head in substantial extension thereof, explosion chambers arranged inside the head with outlets therefrom effective for directing exploded charges to the rotor for rotating it, a chambered shaft driven by the rotor, said shaft extending through the rotor and into said head, a partition within the chamber of said shaft dividing the chamber thereof into separate compartments, one an inlet compartment and the other an outlet compartment, each in communication with the chambered interior of the rotor, a connection between the chambered interior of the head and the inlet compartment of said shaft, other connections arranged between the outlet compartment of said shaft and the chamber of said head whereby said other connections will co-operate with said head, rotor and shaft to form a connected cooling system by which a cooling fluid may be circulated through the chamber of said head and thence through the chamber of said rotor, and means for circulating said fluid.

BRAYTON MORTON.
GEORGE P. WELCH.